No. 698,814. Patented Apr. 29, 1902.
E. C. CHASE & I. E. RICKEY.
DOUGH MANIPULATING AND LOAF FORMING MACHINE.
(Application filed July 9, 1901.)
(No Model.) 3 Sheets—Sheet 1.
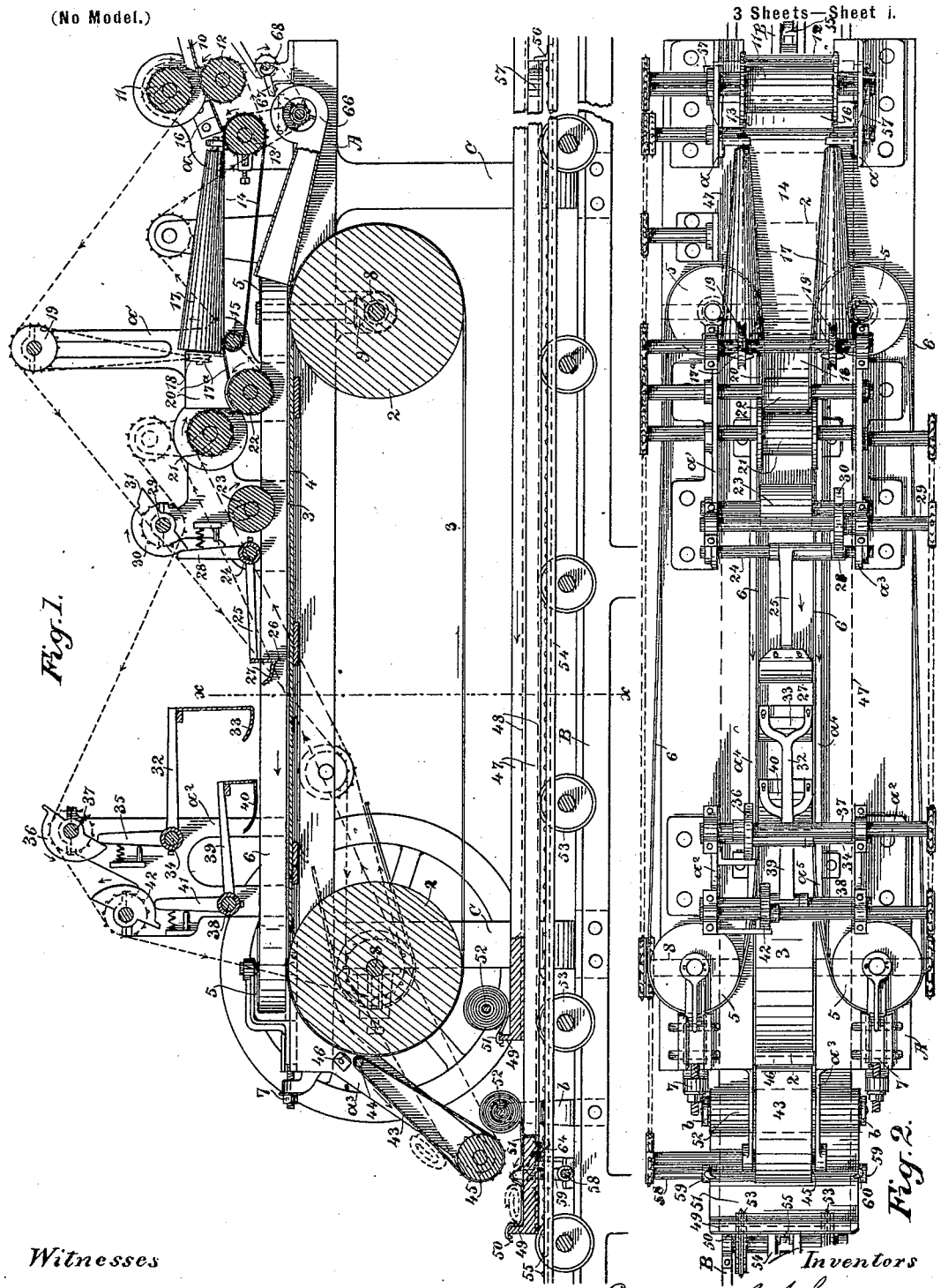
Witnesses
Inventors
Ernest C. Chase
Israel E. Rickey
By Dewey Strong & Co. Attys No. 698,814. Patented Apr. 29, 1902.
E. C. CHASE & I. E. RICKEY.
DOUGH MANIPULATING AND LOAF FORMING MACHINE.
(Application filed July 9, 1901.)
(No Model.) 3 Sheets—Sheet 2.
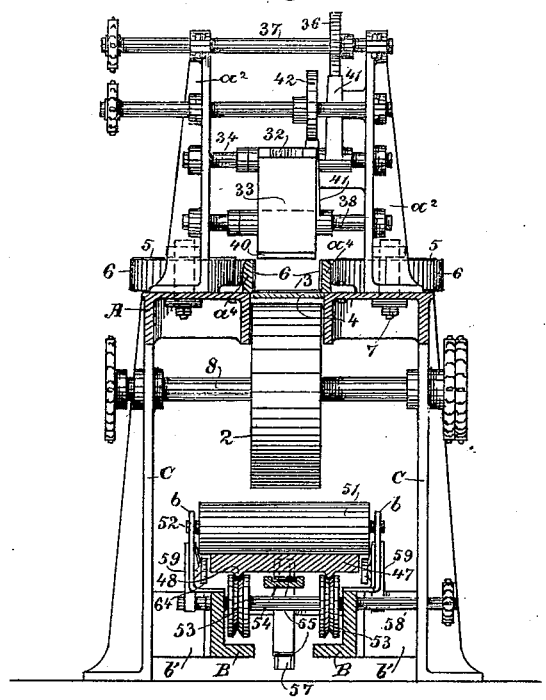
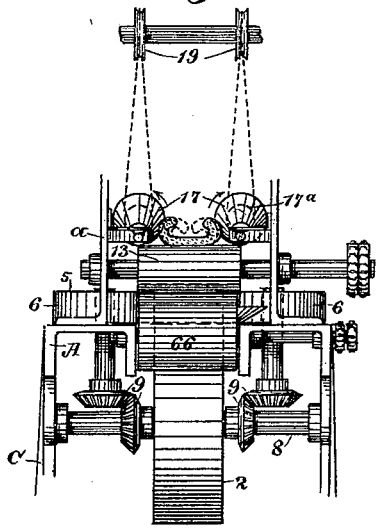
Witnesses,
Inventors,
Ernest C. Chase
Israel E. Rickey
By Dewey Strong & Co.
Attys No. 698,814. Patented Apr. 29, 1902.
E. C. CHASE & I. E. RICKEY.
DOUGH MANIPULATING AND LOAF FORMING MACHINE.
(Application filed July 9, 1901.)
(No Model.) 3 Sheets—Sheet 3.
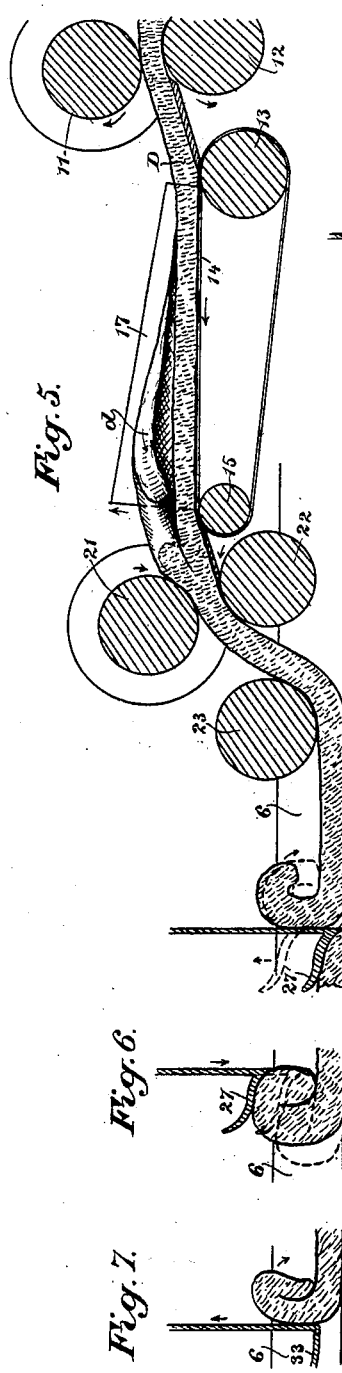
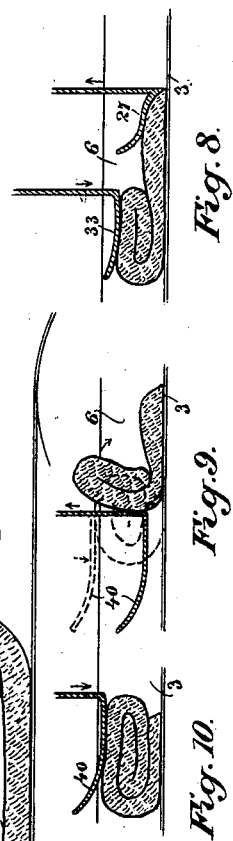
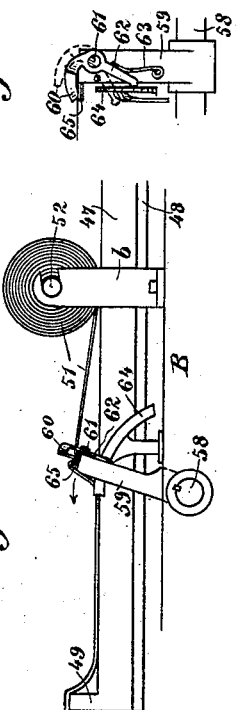
Witnesses,
Inventors,
Ernest C. Chase
Israel E. Rickey
By Dewey Strong & Co.
Atty.

UNITED STATES PATENT OFFICE.

ERNEST C. CHASE AND ISRAEL E. RICKEY, OF SAN FRANCISCO, CALIFORNIA.

DOUGH-MANIPULATING AND LOAF-FORMING MACHINE.

SPECIFICATION forming part of Letters Patent No. 698,814, dated April 29, 1902.

Application filed July 9, 1901. Serial No. 67,575. (No model.)

*To all whom it may concern:*

Be it known that we, ERNEST C. CHASE and ISRAEL E. RICKEY, citizens of the United States, residing in the city and county of San Francisco, State of California, have invented an Improvement in Dough-Manipulating and Loaf-Forming Machines; and we hereby declare the following to be a full, clear, and exact description of the same.

Our invention relates to an apparatus that is designed to manipulate dough and to fold it into the form of loaves and deliver it in readiness for the oven.

It consists of an apparatus comprising rollers, endless traveling belts, and reciprocating cutting and stamping devices whereby the dough is rolled into sheets of even thickness, the edges folded over to counteract the transverse stretch, the sheet folded lengthwise by successive operations and cut into proper lengths, and pressed into the required form of loaves. The loaves are then delivered upon carriers with folds of cloth interposed between them to prevent contact.

Our invention also comprises details of construction, which will be more fully explained by reference to the accompanying drawings, in which—

Figure 1 is a longitudinal vertical section through the machine. Fig. 2 is a plan view of the same. Fig. 3 is a transverse section on line $x\,x$ of Fig. 1 looking toward the rear. Fig. 4 is a front end view, the first two guide-rollers being omitted. Figs. 5, 6, 7, 8, 9, and 10 show the successive movements of the material to form the loaf. Fig. 11 is a front view of the device to form folds between the loaves on the tray. Fig. 12 is a side view of the same.

A represents the main frame of the machine, which may be of any suitable form of construction for convenient support of the mechanisms required for the operation. In the present case it is shown in the form of a rectangular frame having legs C, and B is a supplemental frame located between the legs C and in the lower part and adapted to carry the boards or trays upon which the finished loaves are received at the end of the machine, as will be hereinafter described.

$a\ a'\ a^2\ a^3$ are extensions or attachments of the main frame, adapted to support journals of the various shafts and other parts employed in the apparatus.

Two drums or rollers 2 are journaled upon the main frame, and around these drums an endless steel belt 3 passes and is caused to advance from the receiving toward the discharge end, as shown by the arrows, by any suitable driving-gear or mechanism through which power may be employed for the purpose. The upper portion of this belt passes over a floor or support 4, which keeps it rigid, while allowing it to travel along. Upon each side of this belt are other belts 6, standing vertically and forming sides of a trough, of which the belt 3 forms the bottom. These belts 6 pass around vertically-journaled rollers 5, and power is applied to rotate these rollers and cause the belts 6 to travel in unison with the belt 3. The trough formed by these belts serves to retain the dough in place and at the same time transmit it through the various operations to which it is to be submitted in making the loaves. The dough being first prepared and brought to a proper condition to make into loaves is introduced through a chute, as at 10, Fig. 1, and, passing between the rollers 11 and 12, it is rolled into sheets of a suitable thickness for the purpose desired. From the rollers 11 and 12 it is delivered over a bridge 16 upon the horizontally-traveling belt 14, which passes around the drums 13 and 15, as shown.

Upon each side of the belt 14 are the cone-shaped rollers 17, and these are revolved by any suitable mechanism, as by a sprocket-chain passing over pulleys 18 and 19, the former being fixed to the journal-shafts of the rollers 17, so that these rollers are revolved with the lower parts moving inwardly or toward each other. The cone shape of these rollers and their position with the smaller ends toward the bridge 16, over which the sheet of dough is delivered upon the apron or belt 14, forms a space above the belt, which is wider at the receiving end and which tapers toward the discharge end, and the movement of the rollers in conjunction with the advance of the belt 14 causes the sheet of dough to pass through this narrowing channel. The rollers act to roll up the edges of the dough, as shown in Fig. 4, and these edges are folded upon the top of the main sheet, thus counteracting the transverse stretch caused by rolling the elastic dough out into the sheet by the first set of rollers. As this fold is completed the dough, which is indicated at d, Fig. 5, passes between the rollers 21 and 22, being guided by a bridge intermediate between the rollers 15 and 22, as shown, so as to prevent its passing down between these rollers. As it passes between the rollers 21 and 22 the dough is again flattened into a sheet, the folded edges being pressed down upon the main body, and it is then delivered beneath the roller 23 upon the traveling belt 3 and between the side belts 6. The roller 23 serves to hold the dough down and to guide it properly upon the belt 3. Passing along this belt, the front edge of the dough first strikes against the lower edge of the vertical wall 26 of the curved plate 27, and as the plate remains down for an instant while the dough is advancing the front edge of the dough is curved over, as shown at the end of Fig. 5. An instant after this curving of the dough has taken place the wall 26 is raised, and the dough passing beneath its lower edge is further folded over upon the advancing sheet and just as it has passed the lower edge of the wall it arrives beneath the curved plate 27, which extends from the wall 26 toward the discharge or line of travel of the dough. The wall being again depressed, this plate 27 presses the folded portion of the dough down upon the advancing sheet and then rising allows a further portion of the dough to move along with the part that has already been folded. The second depression of the vertical wall 26 then severs this piece of dough from the advancing dough, and the portion thus severed is sufficient to form a loaf by operations to be hereinafter described.

The turning, cutting, and pressing members 26 27 are carried upon the arm 25 of a bell-crank lever which is fulcrumed, as at 24. The other arm 28 extends upwardly into the line of travel of a cam 30, one protuberance 31 of which contacting with the arm 28 depresses the members 26 27, so that the former cuts off a portion of the dough from the sheet while the plate 27 compresses the portion already folded over upon the part which has been cut off. While the wall 26 thus remains down momentarily, the continually-advancing dough is turned up against it, as shown in Fig. 5, thus commencing the fold for another loaf. As soon as the projection 31 of the cam has passed the arm 28 the latter is retracted by a spring, and the wall 26 is lifted sufficiently to allow a partially-folded sheet to pass beneath, and as it drags below the edge of 26 it is further folded over, as shown in Fig. 6. The next depression of this wall occurs when the second and shorter projection of the cam 30 contacts with the lever 28, and this causes the plate 27 to press the folded dough down upon the part which has been cut off, but which is not yet folded. After leaving this pressure-plate 27 the continued travel of the belt 3 carries the loaf 6 folded against the front of the plate 33, and this rolls the folded portion over again upon the part which has been severed by the operation of the cutting edge of the wall 26. This presser-plate 33 being depressed then presses the second fold of the dough down upon the remaining portion of the sheet, as shown in Fig. 8. The presser-plate 33 is carried upon the end of an arm 32 of a bell-crank lever which is fulcrumed at 34, and the second arm 35 of this lever is actuated by a cam 36, mounted upon a shaft 37 and by which its rotation acts at proper intervals to depress the presser-plate 33 and produce the fold previously described. As soon as the cam passes and releases the arm 35 this is raised by a spring connection of any suitable character. Leaving the presser-plate 33, the dough now arrives at the presser-plate 40, which being depressed at this instant the dough will again be folded upon itself, and when the plate 40 rises the dough carried by the belt 3 passes on beneath the plate 40. This plate 40 is again depressed by the action of its cam just as the dough arrives beneath it, and the final pressure compacts the dough into the shape required for the loaves, which are made in this manner, it being the object of the apparatus to fold the dough and press the folds upon each other instead of crushing a mass of dough into itself. The presser-plate 40 is carried upon one arm 39 of a bell-crank lever fulcrumed at 38, and the other arm 41 of this lever is actuated by a cam 42 in a manner similar to that described for the previous presser-plates, and when the cam has passed the lever the latter may be retracted by a spring or as previously described. It will be understood that these movements of the cutting and presser plates may be made by the movements of the cam and their retraction by springs, or the cams themselves may be so formed that in continuous operation they will produce the desired movements of the various plates. The methods by which this is done are not specifically claimed, as it will be understood that various modifications of these means may be adopted without altering the result. The power to drive the machinery and to produce these movements in unison may be transmitted either by gears or by chain belts passing over sprocket-wheels with suitable idlers or tighteners, and the arrangement of these drivers may also be varied to suit the special arrangement of parts without altering the character or general operation of the machine. When the loaves have thus been completed by the final pressure, as shown in Fig. 10, they are delivered from the end of the traveling belt 3 upon an inclined carrier or belt 43. In the present case we have shown this carrier in the form of a belt passing around a small roller 44 at the upper end and a larger roller 45 at the lower end. A bridge 46, consisting of a thin strip with ends turned up and secured to the sides of the machine, is located at the upper end of the belt 43, and over this bridge the loaves pass to the said belt.

In order to leave the loaves free to be discharged when they arrive at the end of the belt 3, we have shown the rigid supports $a^4$, against which the vertical belts 6 travel, as being diverged or separated toward the discharge end, and the rollers 5, around which the belts 6 pass at this end, are also wider apart than the similar rollers at the receiving end. This allows the belts to separate sufficiently to allow the loaves to freely discharge at this end.

When the dough is first delivered into the apparatus over the chute 10, it is desirable to dredge it with flour sufficiently to prevent its adhering to the various parts through which it is to pass. For this purpose we have shown a means for discharging the flour in small quantities by means of a fan-blower or equivalent air-blast apparatus, as shown at 66.

67 is a table mounted upon a spring or elastic standard and upon which the flour is delivered from a chute or other conveyer, and 68 is a cam revoluble, so as to produce a shaking motion of the table 67, whereby the flour is delivered in small quantities into the end of the blast apparatus 66 and is thus continually discharged in light small quantities, so as to dust over the dough and the parts with which it contacts to prevent sticking.

Upon the frame B beneath the apparatus are journaled a series of wheels or rollers 53, the peripheries of which may be either tongued or grooved to fit corresponding grooves or receive projections from the carrying-trays 47. These trays are in the form of long boards, and being laid in upon the rollers the tongues and grooves fit, so as to guide the boards or trays in their movements. An endless traveling chain 55 passes between the rollers 53 and beneath the trays, and its upper portion is supported parallel with the bottom of the board by a rigid trough or support 54, through which it travels. In the section Fig. 3 we have shown these trays provided with projecting ribs 48, which fit corresponding grooves in the rollers; but it will be manifest that these may be reversed and the boards formed with grooves into which corresponding projections around the peripheries of the rollers will fit. The endless traveling chain has spurs 56 projecting upwardly from it at such intervals as to engage the rear ends of the trays, and thus advance them. The front end of each tray has an upturned loop 49, and to this is attached the front end 50 of a strip of cloth 51, which is rolled or coiled upon a spindle, as at 52. Upon each side of the path of travel of the trays are vertical elastic standards $b$. These standards have notches which serve as bearings for the shaft 52, and these notches are opened from the rear, so that when the roll is advanced, with the tray, its spindle or shaft 52 will fit into these notches in the standards B, and thus hold the roll from further advance. As the trays 47 are carried forward the cloth will commence to unroll, and each completed loaf as it falls off the carrier 43 drops upon this cloth. It is desirable to separate the loaves from each other. Therefore the cloth is folded upward between each adjacent roll, thus forming the proper separation, so that the loaves may be left upon the trays until they have risen after their formation sufficiently to be placed in the oven for baking. The manner of forming these ridges is by constantly advancing a portion of the cloth behind each of the loaves which have dropped upon it. This may be effected in various ways. In the present case we have shown a shaft, as 58, having upon it arms 59 at each side of the cloth-belt. These arms project upwardly and carry upon the upper ends the curved swinging clamps 60, which are pivoted, as at 61, and have arms 62 projecting below the pivots and acted upon by a spring 63, which normally holds the clamp 60 out of contact with the cloth. These clamps project over angular depressions in supports just beneath each edge of the cloth, and when the clamps are pressed down they momentarily hold the cloth in these depressions. The shaft 58 then revolving carries the clamps, and with them the cloth, forward a little faster than the natural rate of travel of the trays, and this raises the fold of the cloth desired. At the instant when this fold has been raised the clamp is released by the action of the segment 64, behind which the arm 62 is passing while the clamp is in engagement; but as soon as it has passed beyond the segment 64 the spring 63 acts to disengage the clamp and throw it outside of the edge of the cloth, so that the shaft 58 is allowed to continue its revolution without the parts touching the cloth. When the clamps arrive in line with the cloth upon another revolution of their shaft, they are again thrown forward to press upon the edge and to again draw it into the elevated fold, as before. In this manner the separation of the loaves is effected, and when the tray has reached the end of its travel another one is in readiness to drop into position, the first one being removed, with its load. The forward movement of the second tray carries the shaft 52 of its cloth-roll into the journals or supports at the top of the arms $b$. Previous to this, however, the roll of the tray which is just passing it must be released, and this is effected by means of lugs or projections 57 upon each side of the rear end of the tray. These lugs are wedge-shaped, and as they pass between the elastic arms $b$ they separate them to such an extent that the shaft 52 will be released and allowed to pass on with its tray. As soon as this tray has passed the lugs, releasing the elastic arms $b$, the latter resume their normal position and are in readiness to receive the shaft of the next cloth-roller.

By the construction of the sheet forming, folding, and cutting devices of this apparatus we are enabled to reduce the dough to a continuous sheet of such equal width, thickness, and consistency that the cutters by which it is severed into lengths, operating in unison with the regular rate of travel of the sheet, will produce loaves of so nearly equal weight that there is no necessity for weighing the dough or the loaves.

Having thus described our invention, what we claim as new, and desire to secure by Letters Patent, is—

1. An apparatus for forming loaves of bread from dough, consisting of means for folding the edges of a sheet of dough upon the main portion, means for compressing the folded portions and uniting them with the main sheet, means for folding the front edge of the sheet upon itself, means for compressing the fold thus made upon the main portion, means for severing the sheet to the proper length, means for again folding the dough upon itself, and means for compressing the fold thus made, and means for producing a final fold and compression to form the loaf.

2. An apparatus for forming bread from dough consisting of rolls between which the dough is reduced to a sheet, an endless traveling belt and a guide intermediate between it and the rolls whereby the dough is transferred upon said belt, rolls journaled upon each side of the belt and revoluble inwardly so as to fold the edges of the sheet of dough over upon the main portion, and rolls between which the folded sheet is passed whereby it is compacted.

3. In an apparatus for the manufacture of loaves of bread from dough, means for reducing the dough to a flat sheet, an endless traveling belt upon which said sheet is delivered, rollers journaled parallel with and overlapping the edges of the sheet, and revoluble inwardly, said rollers being conical and enlarging in diameter from the receiving to the discharge end whereby the edges of the sheet of dough are folded over upon the main body.

4. In an apparatus for the manufacture of loaves from dough, means for reducing the dough to a flat sheet, means for folding the edges of said sheet upon the central portion, means for again reducing the folded parts to a flat sheet, an endless traveling belt upon which said sheet is delivered, a reciprocating plate against which the end of the moving sheet contacts, and by which it is folded backwardly upon the main portion, and a vertically-movable plate by which said fold is pressed down upon the main portion.

5. In an apparatus for the manufacture of loaves from dough, means for reducing the dough to a flat sheet, and means for folding the edges of said sheet and pressing them upon the main body, a horizontal endless traveling belt upon which the sheet of dough is delivered, vertical endless traveling belts disposed upon each side of the main belt between which the edges of the sheet are carried, and vertically-reciprocating plates located above the horizontal belt whereby the sheet is folded and the fold is successively compressed together.

6. In an apparatus for the manufacture of loaves from dough, mechanism by which a sheet is formed from the dough, mechanism by which the edges are folded inwardly and compressed upon the main portion, a horizontally-moving endless belt and vertical side belts between which the sheet of dough passes, a vertically-reciprocating folding plate located above the horizontal belt, said plate carrying an extension by which the fold is compressed upon the main portion, and a cutter by which the sheet is cut into regular lengths.

7. In an apparatus for forming loaves from dough, mechanism by which the dough is formed into a continuous sheet of equal width and thickness, an endless traveling horizontal belt and vertical side belts by which the sheet is guided, a reciprocating folding and compressing plate and cutter for severing the sheet into lengths, and a cam by which said plate is actuated in unison with the movements of the belts.

8. In an apparatus for the manufacture of loaves from dough, mechanism by which the dough is reduced to a continuous sheet of equal width and thickness, an endless traveling belt upon which the sheet is delivered, side guiding-belts acting in unison therewith, a reciprocating folding, compressing and cutting plate, a lever-arm upon which it is carried and a cam by which it is actuated, and supplemental folding and compressing plates with actuating-cams, said cams and plates being operated in unison with each other and the movements of the belt.

9. In an apparatus for the manufacture of loaves from dough, mechanism by which the dough is formed into an endless sheet of equal width and thickness, an endless traveling belt upon which the sheet is delivered and guides upon the sides thereof, means for folding the sheet, compressing the folds and cutting the sheet into approximately equal lengths, and means for discharging the finished loaves from the end of the traveling belt.

10. In an apparatus for the manufacture of loaves from dough, mechanism by which the dough is formed into a continuous sheet of equal width and thickness, an endless traveling horizontal belt upon which the sheet is delivered, means movable in relation to said belt whereby the sheet is folded upon itself and the folds compressed to form a loaf, vertically-disposed endless belts traveling upon each side of the main carrying-belt to act as guides, means for separating said guide-belts at the end of their travel whereby the loaves are released from end pressure and allowed to be discharged.

11. In an apparatus for the manufacture of loaves from dough, mechanism by which the dough is formed into a continuous sheet of equal width and thickness, mechanism by which it is folded, the folds compressed to form a loaf, and the dough severed into lengths of approximately equal size, a discharge over which the finished loaves are delivered and slidable receiving trays or boards, with means for moving them so that the loaves are received successively upon the boards.

12. In an apparatus for the manufacture of loaves from dough, mechanism by which the loaves are formed and delivered from the apparatus, receiving trays or boards, supporting-rollers and an endless traveling chain with lugs by which the trays are moved, guides by which their line of travel is maintained, cloth-rolls mounted upon the front of each board, and means by which the cloth is unrolled as the boards advance to form a surface for the reception of the loaves.

13. In an apparatus for the manufacture of loaves from dough, mechanism by which the loaves are formed from the sheet and delivered from the end of the apparatus, receiving trays or boards with means for moving them in the line of delivery, cloth-rolls attached to the front of each board, standards upon each side having channels into which the shafts of the cloth-rolls are carried by the movement of the board whereby the cloth is unrolled to form a surface for the reception of the loaves.

14. In an apparatus for the manufacture of loaves from dough, boards or trays upon which the finished loaves are delivered, means by which said boards are caused to advance in unison with the delivery, cloth-rolls having the ends attached to the front of the board, elastic standards located upon each side having bearings into which the shafts of the cloth-rolls are carried, and within which they revolve during the passage of the board, and lugs upon each side of the rear of the board whereby the standards are separated, and the shaft of the exhausted roll allowed to pass out with the board.

15. In an apparatus for the manufacture of loaves from dough, mechanism by which the loaves are formed, movable trays or boards upon which the loaves are delivered, cloth-rolls connected with each of the boards to form a surface for the reception of the loaves, and a mechanism by which the cloth is raised into folds between the contiguous loaves.

16. In an apparatus for the manufacture of loaves from dough, trays or boards and mechanism by which they are moved in the line of delivery of the finished loaves, said trays having cloth-rolls connected therewith, and means for unrolling the cloth to form a surface for the reception of the loaves, clamps upon each side of the boards and mechanism by which they are caused to seize the edges of the cloth and mechanism by which they are advanced more rapidly than the movement of the trays whereby the cloth is lifted into folds after the deposit of each loaf and between it and the next.

17. In an apparatus for the manufacture of loaves from dough, boards or trays upon which the completed leaves are delivered, cloth-rolls connected with the boards to provide a surface for the reception of the loaves, a shaft journaled beneath the trays having arms upon its ends, spring-pressed lever-clamps carried by said arms and means for advancing said clamp so as to grip the edges of the cloth at each revolution of the shaft whereby the cloth is lifted into folds between one loaf and the succeeding one, and means for disengaging the clamps after the fold has been formed to allow the shaft to continue its revolution.

In witness whereof we have hereunto set our hands.

ERNEST C. CHASE.
ISRAEL E. RICKEY.

Witnesses:
S. H. NOURSE,
JESSIE C. BRODIE.